(12) United States Patent
Akimoto et al.

(10) Patent No.: US 12,235,944 B2
(45) Date of Patent: Feb. 25, 2025

(54) SIMILARITY DEGREE CALCULATOR, AUTHORIZATION SYSTEM, SIMILARITY DEGREE CALCULATION METHOD, SIMILARITY DEGREE CALCULATION PROGRAM, AND METHOD FOR GENERATING SIMILARITY DEGREE CALCULATION PROGRAM

(71) Applicant: NEC Corporation, Tokyo (JP)

(72) Inventors: Kosuke Akimoto, Tokyo (JP); Seng Pei Liew, Tokyo (JP); Ryo Mizushima, Tokyo (JP); Kong Aik Lee, Tokyo (JP)

(73) Assignee: NEC CORPORATION, Tokyo (JP)

( * ) Notice: Subject to any disclaimer, the term of this patent is extended or adjusted under 35 U.S.C. 154(b) by 168 days.

(21) Appl. No.: 17/914,546

(22) PCT Filed: Mar. 27, 2020

(86) PCT No.: PCT/JP2020/014122
§ 371 (c)(1),
(2) Date: Sep. 26, 2022

(87) PCT Pub. No.: WO2021/192249
PCT Pub. Date: Sep. 30, 2021

(65) Prior Publication Data
US 2023/0143808 A1 May 11, 2023

(51) Int. Cl.
*G06F 21/32* (2013.01)
(52) U.S. Cl.
CPC .................................. *G06F 21/32* (2013.01)

(58) Field of Classification Search
None
See application file for complete search history.

(56) References Cited

U.S. PATENT DOCUMENTS

| | | | |
|---|---|---|---|
| 7,853,081 B2 * | 12/2010 | Thint | G06F 16/355 |
| | | | 382/181 |
| 10,380,498 B1 * | 8/2019 | Chaoji | G06N 7/01 |
| 10,593,336 B2 * | 3/2020 | Boyadjiev | G06F 21/32 |
| 10,679,726 B2 * | 6/2020 | Kalalakaran | G16B 30/00 |
| 11,024,424 B2 * | 6/2021 | Sun | G16H 10/60 |
| 11,710,033 B2 * | 7/2023 | Morris | G06N 3/04 |
| | | | 706/15 |

(Continued)

FOREIGN PATENT DOCUMENTS

| | | |
|---|---|---|
| JP | 2008-059408 A | 3/2008 |
| JP | 2019-067299 A | 4/2019 |
| WO | 2017/209228 A1 | 12/2017 |

OTHER PUBLICATIONS

International Search Report for PCT Application No. PCT/JP2020/014122, mailed on Jul. 28, 2020.

(Continued)

*Primary Examiner* — Backhean Tiv

(57) ABSTRACT

A feature calculation means calculates N features for first data and N features for second data by using N feature functions for obtaining a feature for data on the basis of the data. A similarity degree calculation means calculates a similarity degree between the first data and the second data on the basis of the N features for the first data and the N features for the second data. Values of N features obtained when the same data is substituted into the N feature functions are different from each other.

7 Claims, 8 Drawing Sheets

(56) References Cited

U.S. PATENT DOCUMENTS

| | | | |
|---|---|---|---|
| 11,809,484 B2* | 11/2023 | Planche | G06F 16/55 |
| 2008/0240566 A1* | 10/2008 | Thint | G06F 16/355 |
| | | | 382/181 |
| 2019/0130073 A1* | 5/2019 | Sun | G16H 10/60 |
| 2019/0147357 A1* | 5/2019 | Erlandson | G06N 3/08 |
| | | | 706/12 |
| 2020/0035247 A1* | 1/2020 | Boyadjiev | G06F 21/32 |
| 2020/0125928 A1* | 4/2020 | Doyle | G06V 30/19147 |
| 2020/0322124 A1 | 10/2020 | Isshiki et al. | |
| 2021/0081817 A1* | 3/2021 | Chen | G06N 3/045 |
| 2021/0326729 A1* | 10/2021 | Zhu | G06F 16/735 |
| 2021/0342399 A1* | 11/2021 | Sisto | G06F 16/90332 |
| 2023/0143808 A1* | 5/2023 | Akimoto | G06N 20/00 |
| | | | 726/17 |
| 2023/0222782 A1* | 7/2023 | Amada | G06V 10/764 |
| | | | 706/12 |
| 2023/0259818 A1* | 8/2023 | Amada | G06N 20/00 |
| | | | 706/12 |

OTHER PUBLICATIONS

Hayashi, Eisei et al., "Detection of adversarial examples using output of multiple models", Lecture proceedings (2) of the 81st (2019) National Convention of IPSJ, Artificial intelligence and cognitive science, Feb. 28, 2019, pp. 2-317 to 2-318.

* cited by examiner

SIMILARITY DEGREE CALCULATOR, AUTHORIZATION SYSTEM, SIMILARITY DEGREE CALCULATION METHOD, SIMILARITY DEGREE CALCULATION PROGRAM, AND METHOD FOR GENERATING SIMILARITY DEGREE CALCULATION PROGRAM

This application is a National Stage Entry of PCT/JP2020/014122 filed on Mar. 27, 2020, the contents of all of which are incorporated herein by reference, in their entirety.

TECHNICAL FIELD

The present disclosure relates to a similarity degree calculator, an authorization system, a similarity degree calculation method, a similarity degree calculation program, and a method for generating a similarity degree calculation program.

BACKGROUND ART

Patent Document 1 discloses a technology for performing collation processing on the basis of a feature obtained from a living body and a similarity degree with a collation target in a biological authorization technology.

PRIOR ART DOCUMENTS

Patent Documents

Patent Document 1: PCT International Publication No. WO2017/209228

SUMMARY OF THE INVENTION

Problems to be Solved by the Invention

In machine learning, an attack method called adversarial examples in which an erroneous determination is induced by adding predetermined noise to input data is known. In this method, noise is calculated such that a feature is close to data to be erroneously determined on the basis of a tendency of calculation of a learned model.

A method of suppressing an effect of adversarial examples has been considered in classification of machine learning, but consideration of a technology for suppressing an effect of adversarial examples has been delayed in a technology for causing a machine-learned model to calculate extraction of a feature as described in Patent Document 1.

An example object of the present disclosure is to provide a similarity degree calculator, an authorization system, a similarity degree calculation method, a similarity degree calculation program, and a method of generating a similarity degree calculation program that can suppress occurrence of erroneous determination due to fluctuations derived from learning to solve the problems described above.

Means for Solving the Problems

According to a first example aspect of the present invention, a similarity degree calculator includes a feature calculation means that calculates N features for first data and N features for second data by using N feature functions for obtaining a feature for data on the basis of the data, and a similarity degree calculation means that calculates a similarity degree between the first data and the second data on the basis of the N features for the first data and the N features for the second data, in which values of N features obtained when the same data is substituted into the N feature functions are different from each other.

According to a second example aspect of the present invention, an authorization system includes the similarity degree calculator according to the aspect described above, and an authorization device that performs biological authorization on the basis of a calculation result of the similarity degree calculator.

According to a third example aspect of the present invention, a similarity degree calculation method includes calculating, by a computer, N features for first data and N features for second data by using N feature functions for obtaining a feature for data on the basis of the data, and calculating, by the computer, a similarity degree between the first data and the second data on the basis of the N features for the first data and the N features for the second data, in which values of N features obtained when the same data is substituted into the N feature functions are different from each other.

According to a fourth example aspect of the present invention, a similarity degree calculation program causes a computer to function as a feature calculation means that calculates N features for first data and N features for second data by using N feature functions for obtaining a feature for data on the basis of the data, and a similarity degree calculation means that calculates a similarity degree between the first data and the second data on the basis of the N features for the first data and the N features for the second data, in which values of N features obtained when the same data is substituted into the N feature functions are different from each other.

According to a fifth example aspect of the present invention, a method for generating a similarity degree calculation program includes causing, by a computer, a model network to be learned, which has a first layer having N feature calculation models and a second layer having a model with a calculation result of the first calculation unit as an input to use a learning data set where data is set as an input sample and a one-hot vector indicating a class to which the data belongs among a plurality of classes is set as an output sample, and to output a vector indicating a posterior probability of the class to which the data belongs on the basis of the input data, and generating, by the computer, a similarity degree calculation program by combining the N learned feature calculation model and similarity degree calculation functions for obtaining a similarity degree between the first data and the second data on the basis of calculation results of the N feature calculation models for the first data and calculation results of the N feature calculation models for second data.

Effects of the Invention

According to at least one of the example aspects described above, it is possible to suppress the occurrence of erroneous determination due to fluctuations derived from learning.

EXAMPLE EMBODIMENT

First Example Embodiment

<<Configuration of Authorization System>>

Hereinafter, example embodiments will be described in details with reference to the drawings.

Figure 1:
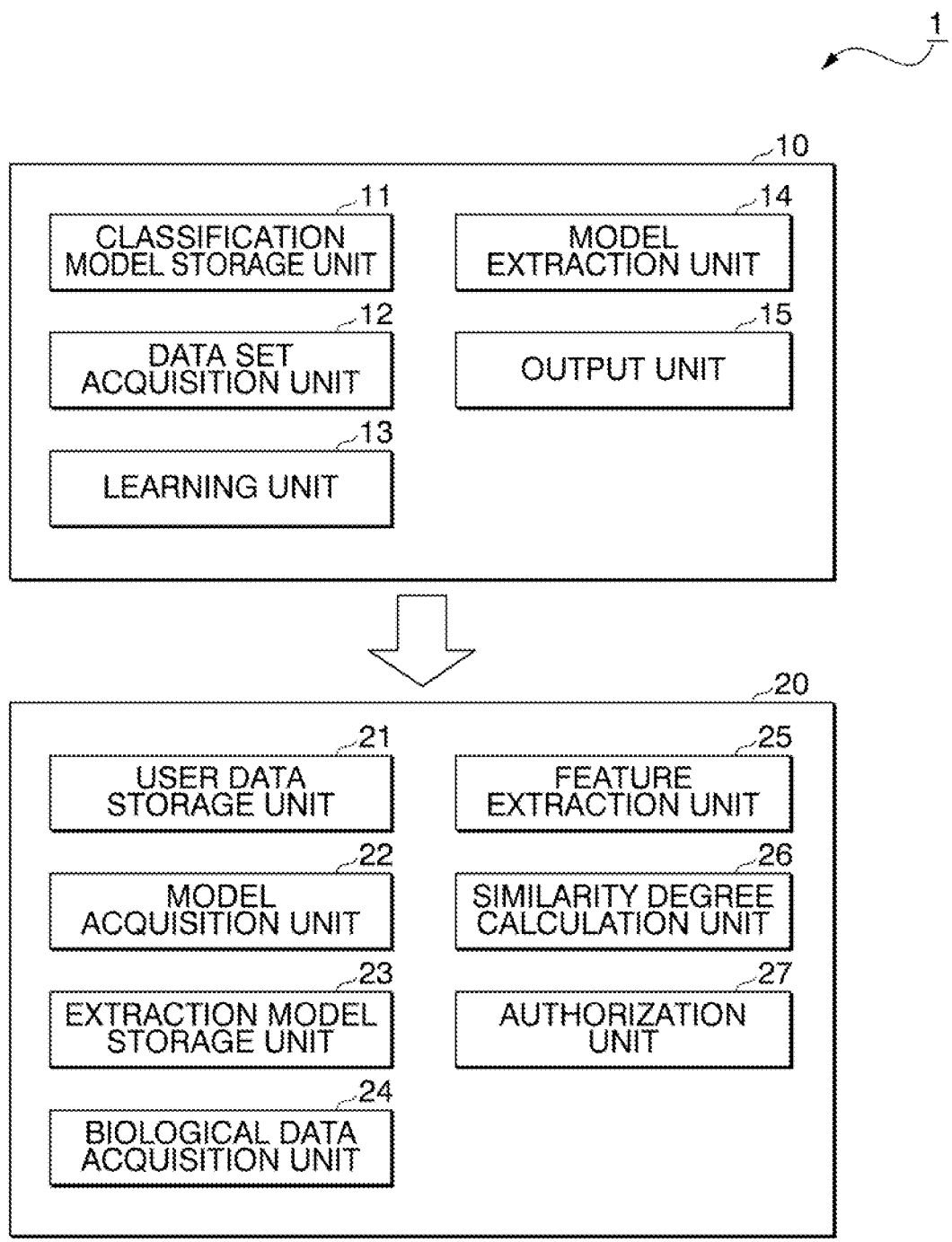
FIG. 1 is a schematic block diagram which shows a configuration of an authorization system according to a first example embodiment.

FIG. 1 is a schematic block diagram which shows a configuration of an authorization system 1 according to a first example embodiment.

The authorization system 1 includes a learning device 10 and an authorization device 20.

The learning device 10 causes parameters of a feature extraction model to be learned to output a feature of biological data when the biological data is input. Examples of the biological data include a facial image, a vein image, fingerprint data, audio data, and the like. The feature extraction model is represented by a machine learning model such as a neural network.

The authorization device 20 performs authorization of a user based on the biological data using a feature extraction model (a learned model) having the parameters learned by the learning device 10.

The authorization system 1 according to the first example embodiment includes the learning device 10 and the authorization device 20 as separate devices, but the present invention is not limited thereto. For example, in the authorization system 1 according to another example embodiment, the authorization device 20 may also have a function of the learning device 10.

<<Configuration of Learning Device 10>>

Figure 2:
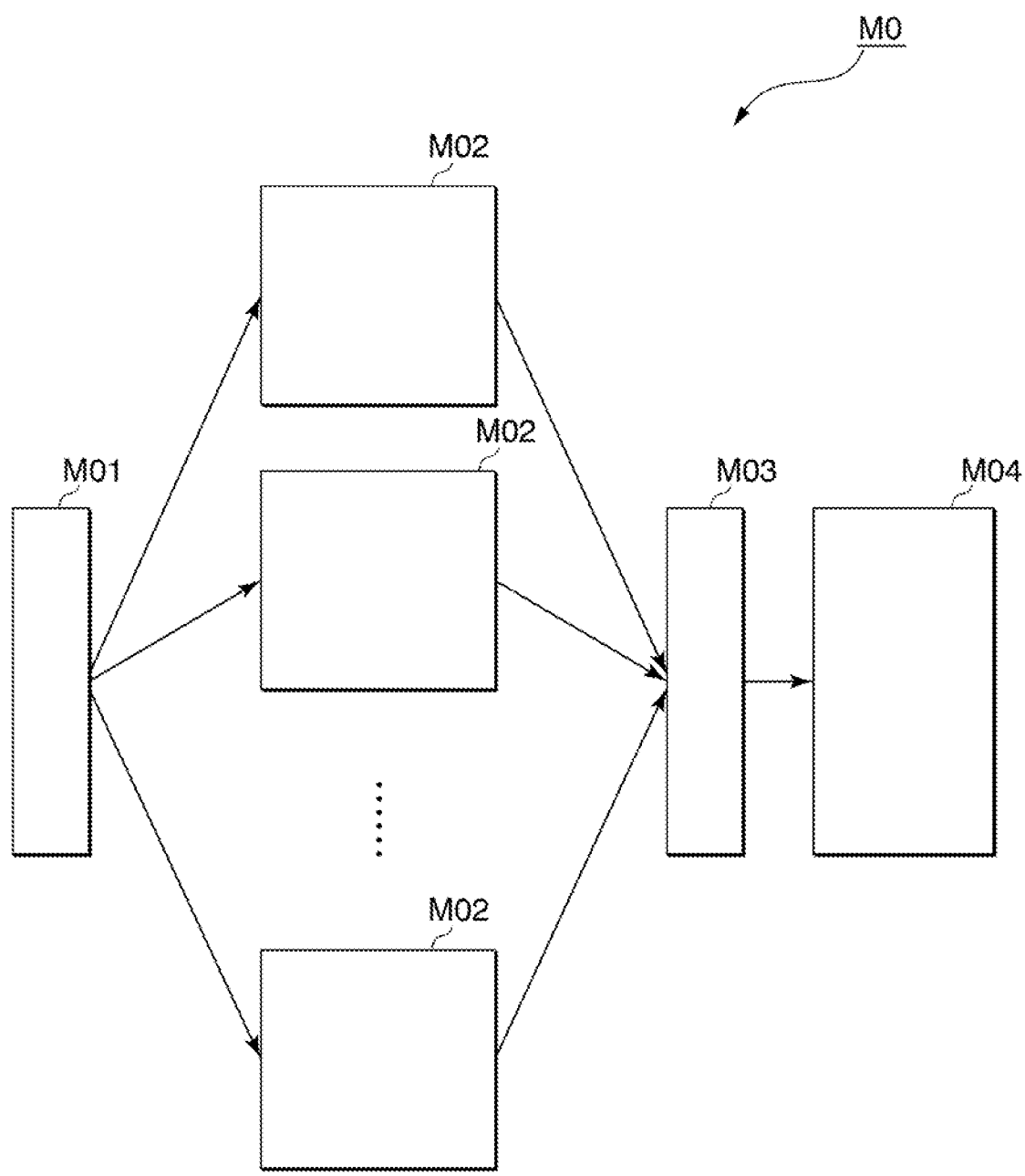
FIG. 2 is a configuration diagram of a classification model M0 learned by a learning device according to the first example embodiment.

FIG. 2 is a configuration diagram of a classification model M0 learned by the learning device 10 according to the first example embodiment.

The learning device 10 includes a classification model storage unit 11, a data set acquisition unit 12, a learning unit 13, a model extraction unit 14, and an output unit 15.

The classification model storage unit 11 stores the classification model M0 constituted by a neural network. The classification model M0 includes, as shown in FIG. 2, an input unit M01, N feature calculation units M02, an averaging unit M03, a classification unit M04, and an output unit M05.

The data set acquisition unit 12 acquires a learning data set in which biological data, which is an input sample, and a person label, which is an output sample, are associated with each other. The person label is represented by a P-dimensional one-hot vector when the number of persons in the data set is P.

The learning unit 13 causes parameters of the classification model M0 to be learned to output a P-dimensional vector that indicates a posterior probability of a person corresponding to biological data when the biological data is input by using the learning data set acquired by the data set acquisition unit 12.

The model extraction unit 14 extracts a partial model formed of the input unit M01, the N feature calculation units M02, and the averaging unit M03 from the classification model M0 learned by the learning unit 13 as the feature extraction model. The output unit 15 outputs the feature extraction model extracted by the model extraction unit 14 to the authorization device 20. The output may be performed by communication via a network or the like, or may be performed via a portable storage device.

<<Configuration of Classification Model M0>>

The classification model M0 includes, as shown in FIG. 2, the input unit M01, N feature calculation units M02, the averaging unit M03, and the classification unit M04.

The input unit M01 outputs the input biological data to the N feature calculation units M02 as a vector.

Each feature calculation unit M02 is constituted by a neural network having two or more layers. The feature calculation unit M02 converts the vector input from the input unit M01 into a low-dimensional feature vector and outputs it to the averaging unit M03. The feature vector is an example of a feature. The feature calculation unit M02 is an example of a feature function and a feature calculation model.

The averaging unit M03 calculates an average value of the N feature vectors input from the N feature calculation units M02 and outputs it to the classification unit M04.

The classification unit M04 is constituted by a neural network having two or more layers. The classification unit M04 converts the feature vector input from the averaging unit M03 into a P-dimensional vector that indicates the posterior probability of a person represented by the feature vector.

<<Learning Method>>

Figure 3:
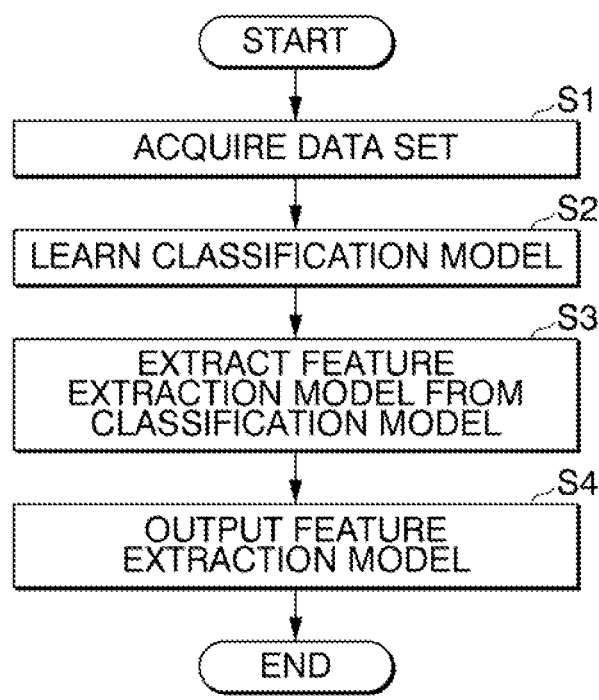
FIG. 3 is a flowchart which shows a learning method of a feature model by the learning device according to the first example embodiment.

FIG. 3 is a flowchart which shows a learning method of a feature model using the learning device 10 according to the first example embodiment.

The data set acquisition unit 12 of the learning device 10 acquires a data set prepared in advance from a data-base (not shown) (step S1). The learning unit 13 causes the parameters of the classification model M0 stored by the classification model storage unit 11 to be learned by using the acquired data set (step S2). At this time, the learning unit 13 updates each parameter according to a gradient descent method to minimize a loss function shown in the following equation (1) by using a calculation result of the classification model M0. The learning unit 13 updates the parameters of the feature calculation unit M02 and the classification unit M04 of the classification model M0.

[Math 1]

$$L = L_{ECE} - \alpha \det(\tilde{M}^\dagger \tilde{M}) \quad (1)$$

Here, $L_{ECE}$, which is the first term of the evaluation value L, is a cross entropy error between an output value of the classification model M0 and an output sample of the data set. The cross entropy error may include a constant term. A matrix M is an N×P matrix obtained by arranging N feature vectors side by side. det( ) is a function indicating a determinant.

That is, the second term of the evaluation value L of the loss function according to the first example embodiment becomes smaller as an inner product of the N feature calculation units M02 is reduced, that is, as orthogonality is increased. For this reason, by using the loss function according to Equation (1), it is possible to cause the parameters to be learned such that calculation methods of a feature by the N feature calculation units M02 are different from each other. By the parameters being learned in this manner, values of N features obtained when the same data is substituted to the N feature calculation units M02 are different from each other.

The learning unit 13 ends learning processing when the evaluation value of the loss function falls below a predetermined threshold value or when the learning processing is repeated a predetermined number of times.

When the learning processing by the learning unit 13 ends, the model extraction unit 14 extracts a partial model formed of the input unit M01, the N feature calculation units M02, and the averaging unit M03 from the classification model M0 learned by the learning unit 13 as a feature extraction model (step S3). Then, the output unit 15 outputs the extracted feature extraction model to the authorization device 20 (step S4).

<<Configuration of Authorization Device 20>>

The authorization device 20 includes a user data storage unit 21, a model acquisition unit 22, an extraction model storage unit 23, a biological data acquisition unit 24, a feature extraction unit 25, a similarity degree calculation unit 26, and an authorization unit 27.

The user data storage unit 21 stores account data of a user and biological data of the user in association.

The model acquisition unit 22 acquires a learned feature extraction model from the learning device 10.

The extraction model storage unit 23 stores the learned feature extraction model acquired by the model acquisition unit 22.

The biological data acquisition unit 24 acquires biological data to be authorized from a sensor or the like provided in the authorization device 20.

The feature extraction unit 25 extracts a feature vector from the biological data stored by the user data storage unit 21 and the biological data acquired by the biological data acquisition unit 24 using the feature extraction model stored by the extraction model storage unit 23.

The similarity degree calculation unit 26 calculates the similarity degree between two feature vectors. Examples of a scale of the similarity degree include an L2 distance, a degree of cosine similarity, a probabilistic linear discriminant analysis (PLDA), and the like. It can be said that a function constituting the similarity degree calculation unit 26 in a program for realizing the authorization device 20 is a function of calculating the similarity degree.

The authorization unit 27 authorizes whether the user is a user stored by the user data storage unit 21 on the basis of the similarity degree calculated by the similarity degree calculation unit 26. When it is determined that the user is a user stored by the user data storage unit 21, the authorization unit 27 returns the account data of the user.

<<Authorization Method>>

Figure 4:
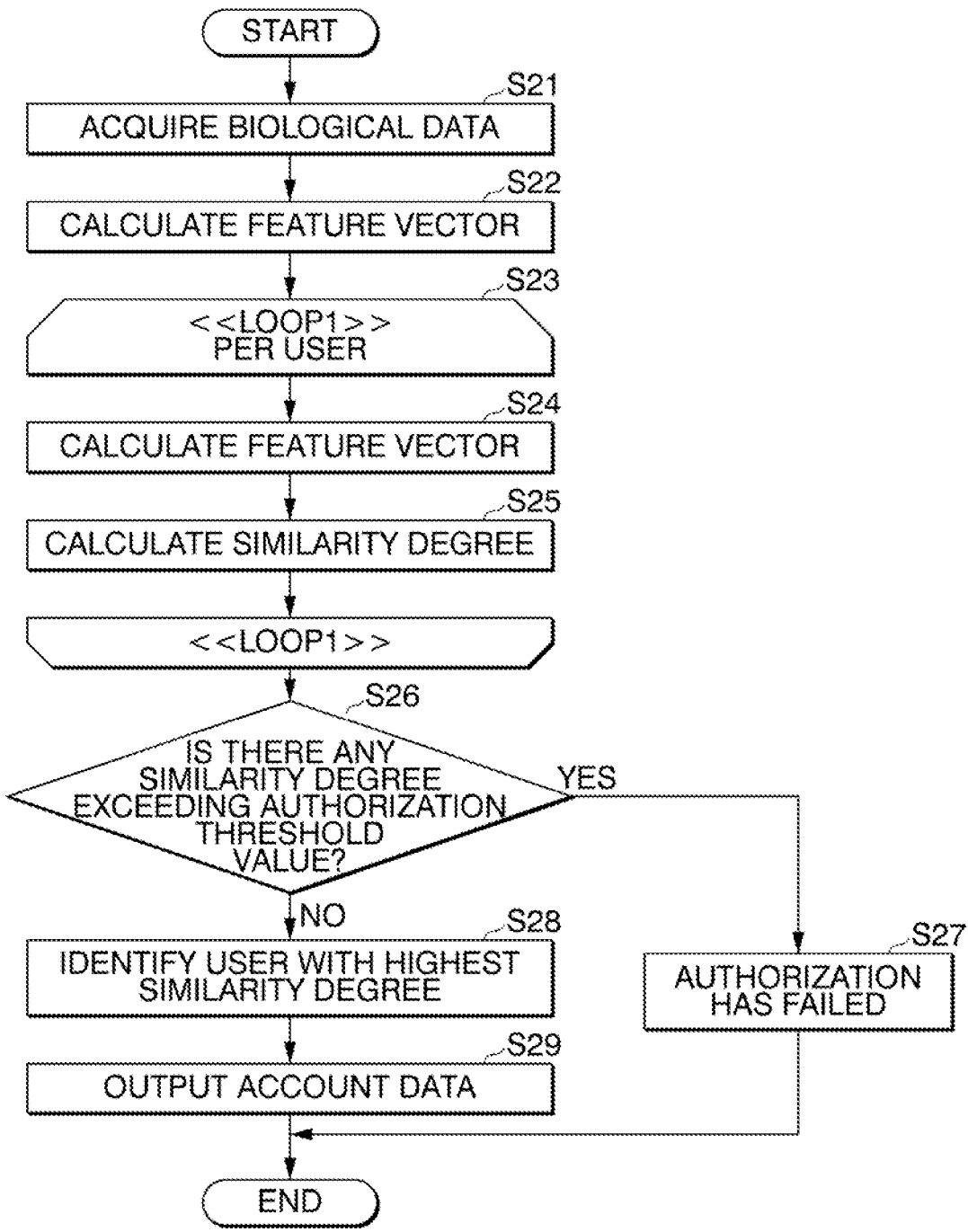
FIG. 4 is a flowchart which shows an authorization method using an authorization device according to the first example embodiment.

FIG. 4 is a flowchart that shows an authorization method using the authorization device 20 according to the first example embodiment. Before the authorization method is executed, it is assumed that the model acquisition unit 22 acquires the learned feature extraction model from the learning device 10 and records it in the extraction model storage unit 23.

The biological data acquisition unit 24 of the authorization device 20 acquires biological data from a sensor or the like connected to the authorization device 20 (step S21). The feature extraction unit 25 calculates a feature vector by inputting the biological data acquired in step S21 to the feature extraction model stored by the extraction model storage unit 23 (step S22). That is, the feature extraction unit 25 calculates N feature vectors using N feature calculation units M02, and generates one feature vector from the N feature vectors using the averaging unit M03. Next, the authorization device 20 selects users stored by the user data storage unit 21 one by one (step S23), and executes steps S24 to S25 shown below.

First, the feature extraction unit 25 calculates a feature vector by inputting biological data associated with the users selected in step S23 to the feature extraction model stored by the extraction model storage unit 23 (step S24). That is, the feature extraction unit 25 calculates N feature vectors using the N feature calculation units M02, and generates one feature vector based on the N feature vectors using the averaging unit M03. Next, the similarity degree calculation unit 26 calculates a similarity degree between the feature vector calculated in step S22 and the feature vector calculated in step S24 (step S25).

When the similarity degree with the acquired biological data of each user stored by the user data storage unit 21 is calculated, the authorization unit 27 determines whether any of the calculated degrees of similarity exceeds a predetermined authorization threshold value (step S26). When all the degrees of similarity are equal to or less than the authorization threshold value (NO in step S26), the authorization unit 27 determines that the authorization using the biological data acquired in step S21 has failed (step S27), and ends the processing.

On the other hand, when at least one similarity degree exceeds the authorization threshold value (YES in step S26), the authorization unit 27 identifies a user with the highest similarity degree (step S28) and outputs the account data of the user. (Step S29).

<<Action and Effect>>

As described above, in the authorization system 1 according to the first example embodiment, N feature vectors are calculated by using a neural network having N feature calculation units M02, and the similarity degree between the acquired biological data and the biological data stored by the user data storage unit 21 is calculated on the basis of the N feature vectors. By using the N feature calculation units M02, it is possible to hide a tendency of calculation of each output feature calculation unit M02. Therefore, with benefits of ensemble learning of the N feature calculation units M02, the authorization system 1 can suppress occurrence of erroneous determination due to fluctuations derived from learning.

Second Example Embodiment

The authorization system according to a second example embodiment reduces the amount of calculation related to learning of a feature extraction model as compared with the first example embodiment.

The authorization system according to the first example embodiment performs the learning of a feature extraction model using the classification model shown in FIG. 2. On the other hand, the authorization system according to the second example embodiment uses a classification model shown in FIG. 5.

Figure 5:
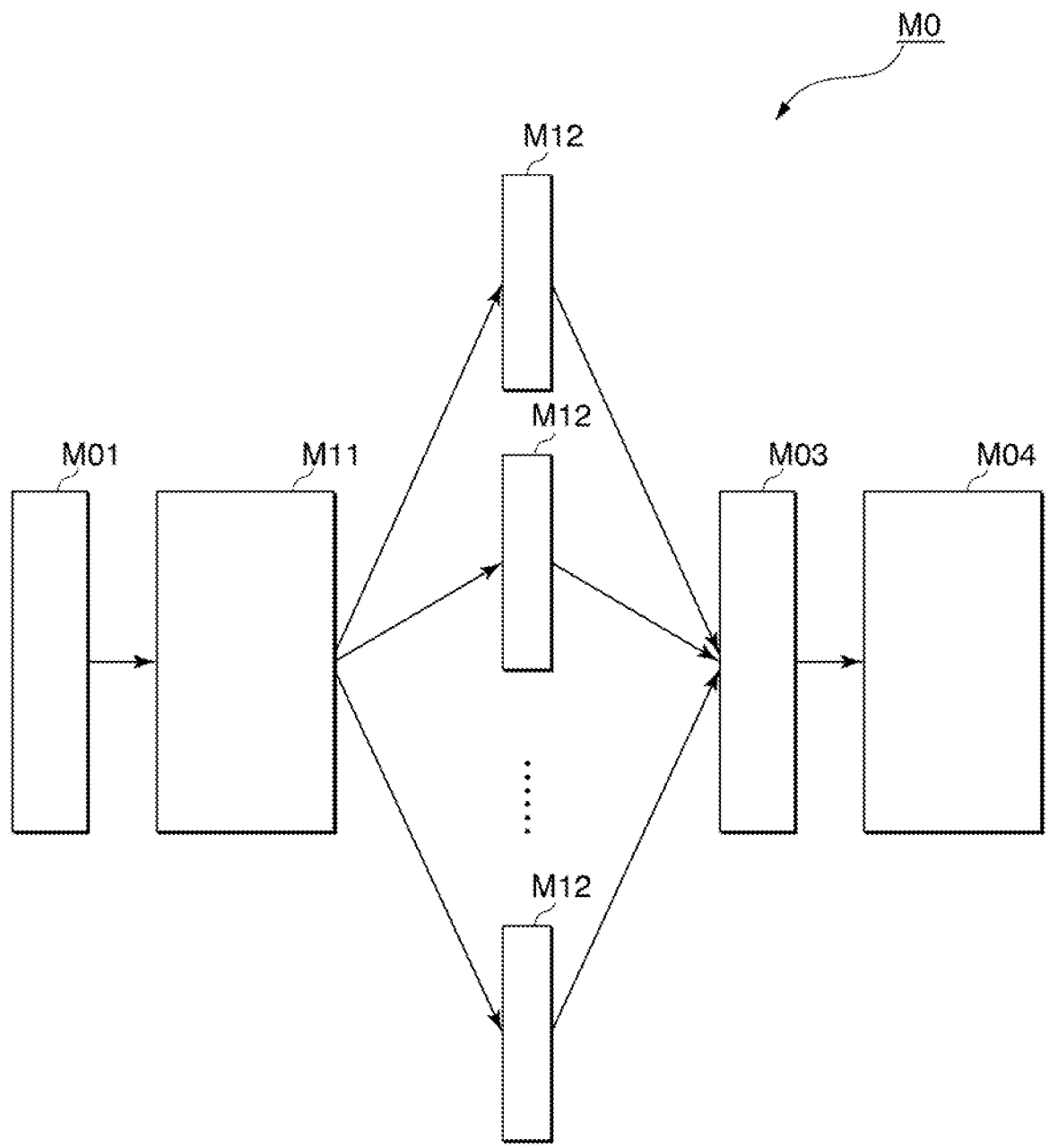
FIG. 5 is a configuration diagram of the classification model M0 learned by a learning device according to a second example embodiment.

FIG. 5 is a configuration diagram of a classification model M0 learned by a learning device 10 according to the second example embodiment.

The classification model M0 according to the second example embodiment includes, as shown in FIG. 5, an input unit M01, a shared feature calculation unit M11, N feature calculation units M12, an averaging unit M03, and a classification unit M04.

The input unit M01 outputs the input biological data to the shared feature calculation unit M11 as a vector.

The shared feature calculation unit M11 is constituted by a neural network having two or more layers. A network structure of the shared feature calculation unit M11 has the same structure as a front-stage portion when the feature calculation unit M02 according to the first example embodiment is divided into the front-stage portion and a rear-stage portion. A calculation result of the shared feature calculation unit M11 is output to the N feature calculation units M12.

Each feature calculation unit M12 is constituted by a neural network having two or more layers. A network structure of the feature calculation unit M12 has the same structure as the rear-stage portion when the feature calculation unit M02 according to the first example embodiment is divided into the front-stage portion and the rear-stage portion. Results of calculation of the N feature calculation units M12 are each output to the averaging unit M03.

The averaging unit M03 calculates an average value of N feature vectors input from the N feature calculation unit M12 and outputs it to the classification unit M04.

The classification unit M04 is constituted by a neural network having two or more layers. The classification unit M04 converts the feature vector input from the averaging unit M03 into a P-dimensional vector indicating a posterior probability of a person represented by the feature vector.

As described above, according to the second example embodiment, since the number of shared feature calculation units M11 is smaller than that of the first example embodiment, the amount of calculation related to learning can be reduced. Since the feature calculation unit M12 has a smaller number of layers than the feature calculation unit M02 according to the first example embodiment, learning processing can be performed with a small amount of calculation.

Third Example Embodiment

Figure 6:
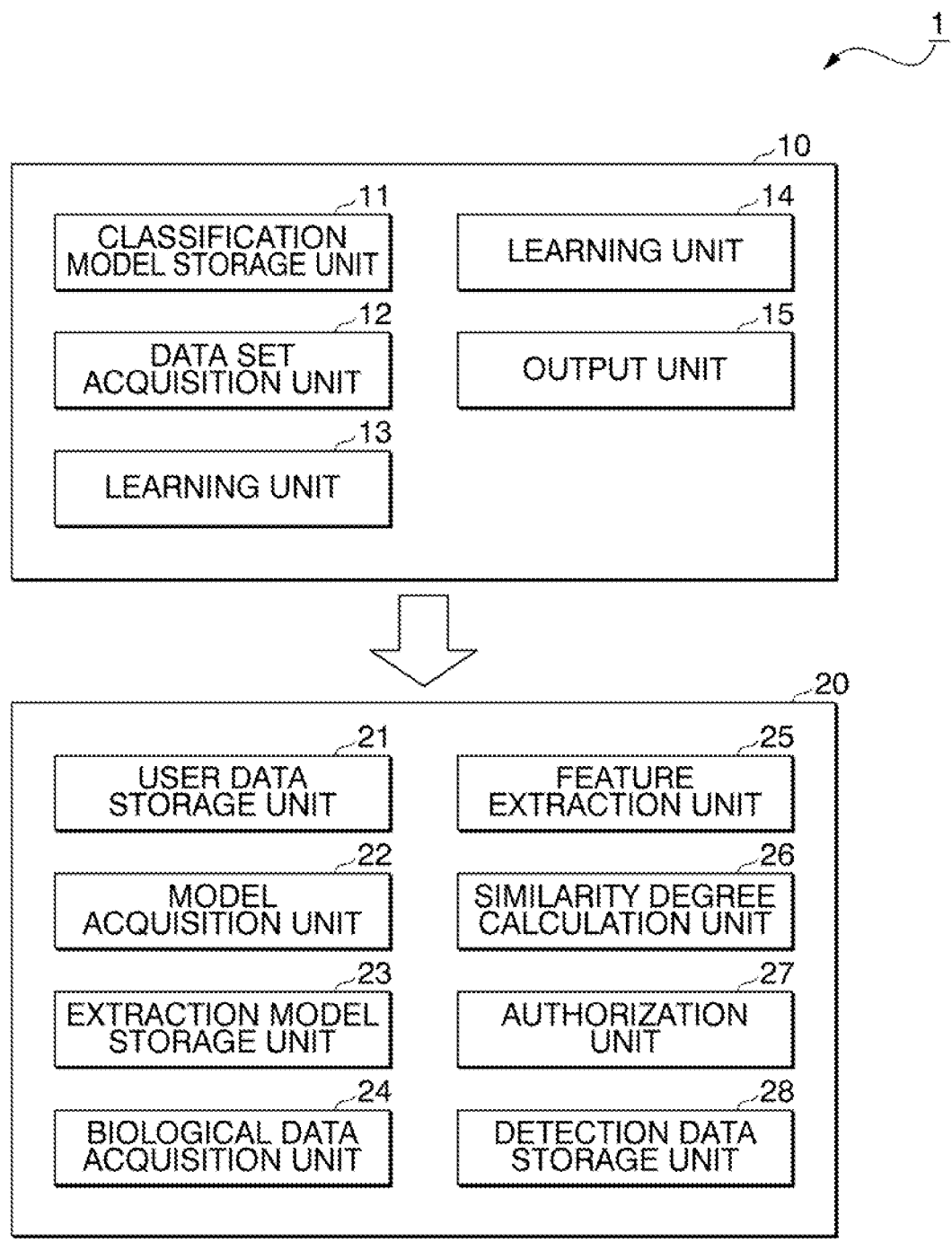
FIG. 6 is a schematic block diagram which shows a configuration of an authorization system according to a third example embodiment.

An authorization system according to a third example embodiment reduces a probability that erroneous determination occurs as compared with the first example embodiment and the second example embodiment.
<<Configuration of Authorization Device 20>>
FIG. 6 is a schematic block diagram which shows a configuration of an authorization system 1 according to the third example embodiment.

An authorization device 20 according to the third example embodiment further includes a detection data storage unit 28 in addition to the configuration according to the first example embodiment.

The detection data storage unit 28 stores biological data (hereinafter, also referred to as detection data) used for detecting adversarial data that causes an erroneous determination of the authorization device 20. Examples of adversarial data includes voice data (Master Voice), which has a high similarity degree with voice data of a plurality of users, and the like. Examples of detection data includes biological data of a person who is not stored in the user data storage unit 21, that is, who does not have account data.

Figure 7:
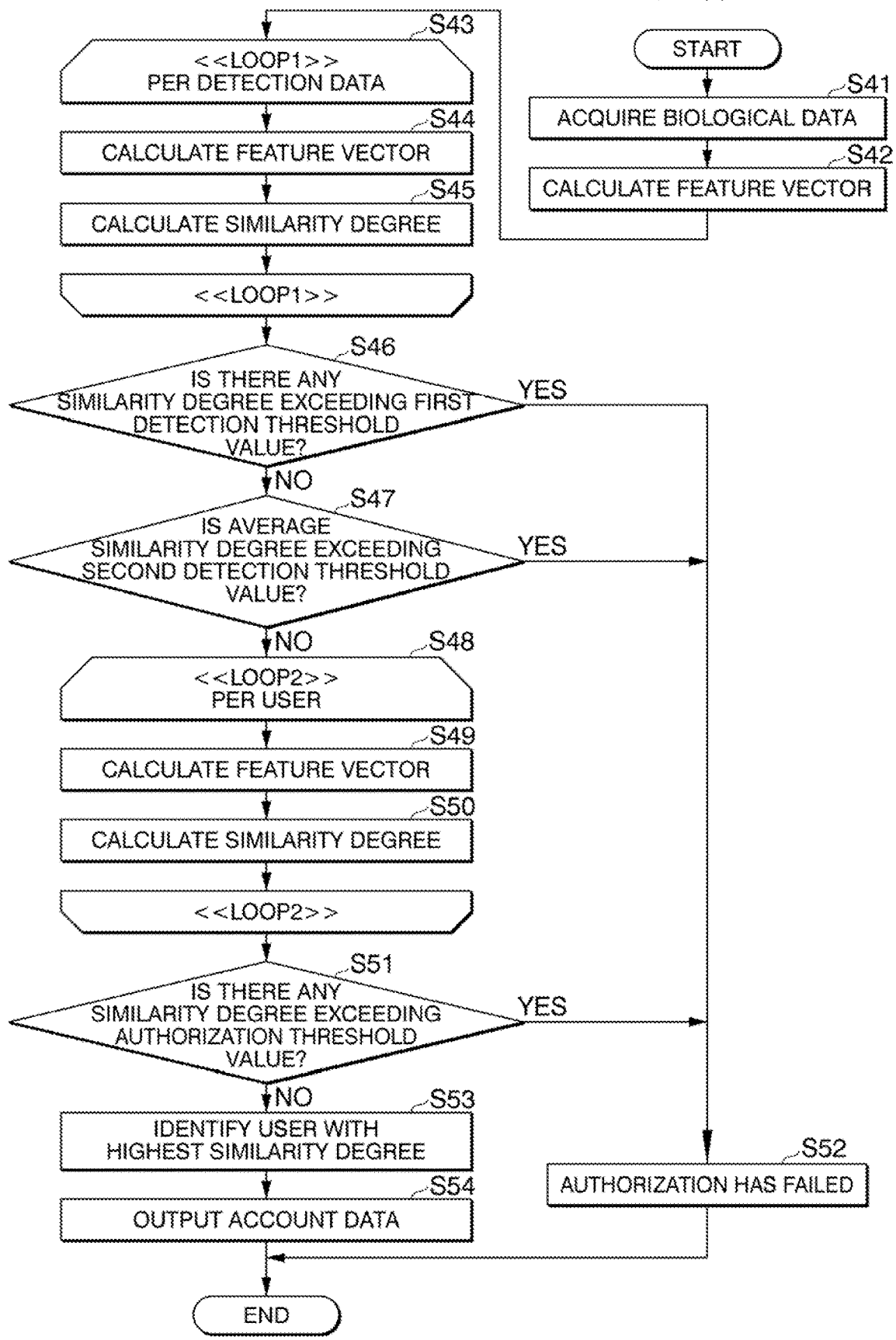
FIG. 7 is a flowchart which shows an authorization method using an authorization device according to the third example embodiment.

In other example embodiments, detection data may be stored in the user data storage unit 21 instead of the detection data storage unit 28. In this case, the user data storage unit 21 stores information indicating that corresponding data is detection data in association with the detection data.
<<Authorization Method>>
FIG. 7 is a flowchart which shows an authorization method using the authorization device 20 according to the third example embodiment. Before the authorization method is executed, it is assumed that the model acquisition unit 22 acquires the learned feature extraction model from the learning device 10 and records it in the extraction model storage unit 23.

The biological data acquisition unit 24 of the authorization device 20 acquires biological data from a sensor or the like connected to the authorization device 20 (step S41). The feature extraction unit 25 calculates a feature vector by inputting the biological data acquired in step S41 to the feature extraction model stored by the extraction model storage unit 23 (step S42).

Next, the authorization device 20 selects detection data stored by the detection data storage unit 28 one by one (step S43), and executes steps S44 to S45 shown below.

First, the feature extraction unit 25 calculates a feature vector by inputting biological data for adversarial examples selected in step S43 to the feature extraction model stored by the extraction model storage unit 23 (step S44). Next, the similarity degree calculation unit 26 calculates the similarity degree between the feature vector calculated in step S42 and the feature vector calculated in step S44 (step S45).

When the similarity degree with the acquired biological data is calculated for each detection data stored by the detection data storage unit 28, the authorization unit 27 determines whether any of the calculated degrees of similarity exceeds a first detection threshold value (step S46). When the similarity degree with at least one piece of detection data exceeds the first detection threshold value (YES in step S46), the biological data acquired in step S41 is highly likely to be adversarial data, and thus the authorization unit 27 determines that the authorization has failed (step S52), and ends the processing.

In addition, the authorization unit 27 determines whether an average value of the degrees of similarity calculated in step S45 exceeds a second detection threshold value (step S47). When the similarity degree with at least one piece of detection data exceeds the detection threshold (YES in step S47), the biological data acquired in step S41 is highly likely to be adversarial data, and thus the authorization unit 27 determines that the authorization has failed (step S52), and ends the processing. This is because adversarial data such as Master Voice has a feature that the similarity degree with a plurality of pieces of biological data is high.

On the other hand, when the degrees of similarity with all pieces of detection data are equal to or less than the detection threshold value (No in step S46) and the average value of the degrees of similarity is equal to or less than the second detection threshold value (NO in step S47), the authorization device 20 selects users stored by the user data storage unit 21 one by one (step S48), and executes steps S49 to S50 shown below.

First, the feature extraction unit 25 calculates a feature vector by inputting biological data associated with the users selected in step S47 to the feature extraction model stored by the extraction model storage unit 23 (step S49). Next, the similarity degree calculation unit 26 calculates the similarity degree between the feature vector calculated in step S42 and the feature vector calculated in step S49 (step S50).

When the similarity degree with the acquired biological data is calculated for each user stored by the user data storage unit 21, the authorization unit 27 determines whether any of the calculated degrees of similarity exceeds a predetermined authorization threshold value (step S51). The authorization threshold value may be a value different from the detection threshold value. When all the degrees of similarity are equal to or less than the authorization threshold value (No in step S52), the authorization unit 27 determines that the authorization using the biological data acquired in step S41 has failed (step S53), and ends the processing.

On the other hand, when at least one similarity degree exceeds the authorization threshold value (YES in step S51), the authorization unit 27 identifies a user with the highest similarity degree (step S53) and outputs the account data of the user (step S54).

<<Action and Effect>>

As described above, in the authorization system 1 according to the third example embodiment, when the acquired biological data is similar to unknown biological data, the authorization processing is ended without performing a comparison with the biological data of a user. As a result, the authorization system 1 can reduce possibility that erroneous determination occurs due to adversarial data.

In the third example embodiment, the authorization unit 27 performs the determination of step S46 and step S27 to determine whether the biological data is adversarial data, but the present invention is not limited thereto. For example, the authorization unit 27 according to another example embodiment may perform only one determination of step S46 and step S27.

Although the example embodiment has been described in details with reference to the drawings, a specific configuration is not limited to the description above, and various design changes or the like can be made. That is, in other example embodiments, an order of the processing described above may be changed as appropriate. In addition, some of the processing may be executed in parallel.

The authorization system 1 according to the example embodiments described above is constituted by the learning device 10 and the authorization device 20, but may also be constituted by a single computer. Alternatively, the learning device 10 and the authorization device 20 each may be arranged separately on a plurality of computers, and the plurality of computers may cooperate with each other to function as the learning device 10 and the authorization device 20.

The authorization system 1 according to the example embodiments described above uses what is shown in Math (1) as the loss function, but is not limited to this. For example, in the learning device 10 of the authorization system 1 according to another example embodiment, Math (2) shown below may be used as a loss function.

[Math 2]

$$L = L_{ECE} - \alpha \det(\tilde{M}^T \tilde{M}) + \|p(k|x) - p(k|AX(x))\| \quad (2)$$

That is, a norm of a difference between a posterior probability vector p (k|x) of an input x and a posterior probability vector p (k|AX (x)) of adversarial examples of the input x may be provided as a third term in Math (1).

In addition, the authorization system 1 according to the example embodiments described above extracts a feature extraction model by removing the classification unit M04 from the classification model M0, but the present invention is not limited thereto. For example, the authorization system 1 according to another example embodiment may extract only the feature calculation unit M02. In this case, the authorization device 20 has a function corresponding to the input unit M01 and the averaging unit M03 in advance.

Moreover, the authorization system 1 according to the example embodiments described above causes N feature calculation units M02 to perform learning using the same data set at the time of learning, but the present invention is not limited thereto. For example, the authorization system according to another example embodiment may cause the feature calculation unit M02 to perform learning using different data sets.

In addition, in the example embodiment described above, the similarity degree calculator is mounted in the authorization device 20, but the present invention is not limited thereto. In other example embodiments, the similarity degree calculator may function independently or may be incorporated into another device.

<Basic Configuration>

Figure 8:
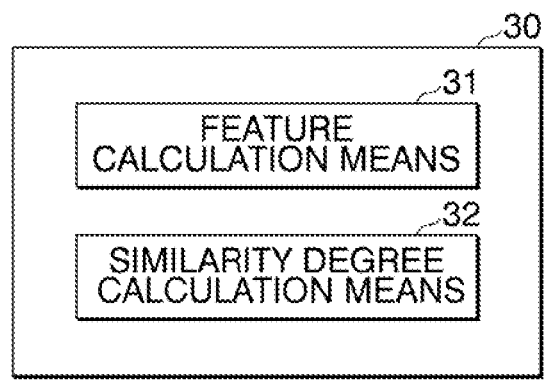
FIG. 8 is a schematic block diagram which shows a basic configuration of a similarity degree calculator.

FIG. 8 is a schematic block diagram which shows a basic configuration of the similarity degree calculator 30.

In the example embodiments described above, the configuration shown in FIG. 1 has been described as an example embodiment of the similarity degree calculator 30, but a basic configuration of the similarity degree calculator 30 is as shown in FIG. 8.

That is, the similarity degree calculator 30 sets a feature calculation means 31 and a similarity degree calculation means 32 as basic constituents.

The feature calculation means 31 calculates N features for first data and N features for second data by using N feature functions for obtaining a feature for data on the basis of the data.

The similarity degree calculation means 32 calculates the similarity degree between the first data and the second data on the basis of N features for the first data and N features for the second data.

Values of the N features obtained when the same data is substituted into the N feature functions are different from each other.

As a result, the similarity degree calculator 30 can suppress the occurrence of erroneous determination due to fluctuations derived from learning.

<Computer Configuration>

Figure 9:
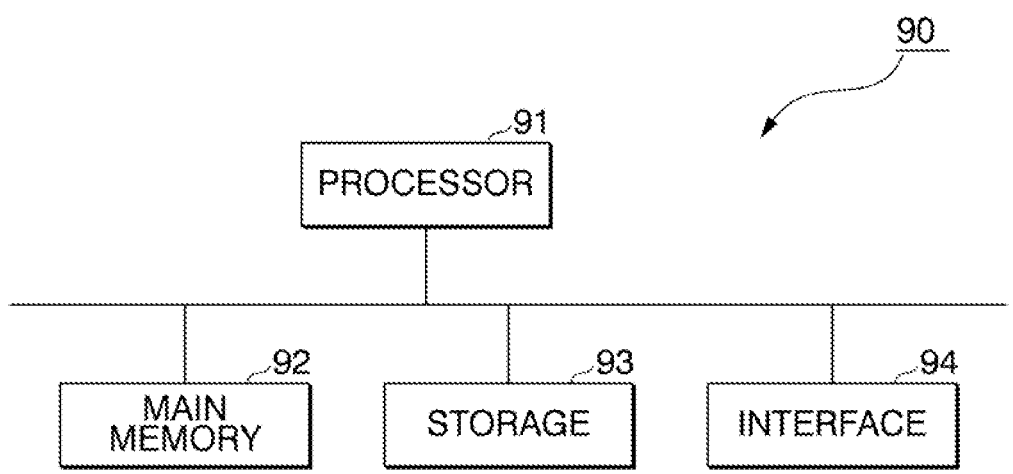
FIG. 9 is a schematic block diagram which shows a configuration of a computer according to at least one example embodiment.

FIG. 9 is a schematic block diagram which shows a configuration of a computer according to at least one example embodiment.

A computer 90 includes a processor 91, a main memory 92, a storage 93, and an interface 94.

The learning device 10, the authorization device 20, and the similarity degree calculator 30 are mounted in the computer 90. Then, operations of each processing unit described above are stored in the storage 93 in a form of a program. The processor 91 reads a program from the storage 93, expands it to the main memory 92, and executes the processing described above according to the program. In addition, the processor 91 ensures a storage region corresponding to each storage unit described above in the main memory 92 according to the program. Examples of the processor 91 include a central processing unit (CPU), a graphic processing unit (GPU), a microprocessor, and the like.

The program may be for realizing a part of the functions to be exerted by the computer 90. For example, the program may be performed to exert the function in combination with another program already stored in a storage, or in combination with another program mounted in another device. In other example embodiments, the computer 90 may include a custom large scale integrated circuit (LSI) such as a programmable logic device (PLD) in addition to or in place of the configuration described above. Examples of the PLD include programmable array logic (PAL), generic array logic (GAL), a complex programmable logic device (CPLD), and a field programmable gate array (FPGA). In this case, a part or all of the functions realized by the processor 91 may be realized by the integrated circuit. Such an integrated circuit is also included as an example of a processor.

Examples of the storage 93 include a hard disk drive (HDD), a solid state drive (SSD), a magnetic disk, an optical magnetic disk, a compact disc read only memory (CD-ROM), a digital versatile disc read only memory (DVD-ROM), a semiconductor memory, and the like. The storage 93 may be an internal media directly connected to a bus of the computer 90, or may also be an external media connected to the computer 90 via the interface 94 or a communication line. Moreover, when this program is distributed to the computer 90 by a communication line, the computer 90 that has received the distribution may expand the program to the main memory 92 and execute the processing described above. In at least one example embodiment, the storage 93 is a non-temporary tangible storage medium.

Moreover, the program may be for realizing a part of the functions described above. Furthermore, the program may be a so-called difference file (a difference program) that realizes the functions described above in combination with other programs already stored in the storage 93.

<Supplementary Note>

A part or all of the example embodiments described above may be described as in the following supplementary notes, but are not limited to the following.

(Supplementary Note 1)

A similarity degree calculator includes a feature calculation means that calculates N features for first data and N features for second data by using N feature functions for obtaining a feature for data on the basis of the data, and a similarity degree calculation means that calculates a similarity degree between the first data and the second data on the basis of the N features for the first data and the N features for the second data, in which values of N features obtained when the same data is substituted into the N feature functions are different from each other.

(Supplementary Note 2)

The similarity degree calculator according to Supplementary Note 1 further includes a shared feature calculation means that calculates a shared feature for the first data and a shared feature for the second data by using a shared feature function for obtaining a shared feature shared as an input to the N feature functions by inputting data, in which the N feature functions each output the feature by inputting the shared feature, and the feature calculation means calculates the N features for the first data by inputting the shared feature for the first data to the N feature functions, and calculates the N features for the second data by inputting the shared feature for the second data to the N feature functions.

(Supplementary Note 3)

The similarity degree calculator according to Supplementary Note 1 or Supplementary Note 2, in which the N feature functions are constituted by N learned feature calculation models in a model network that has a first calculation unit having the N feature calculation models and a second calculation unit having a model with a calculation result of the first calculation unit as an input, learned to use a learning data set where data is set as an input sample and a one-hot vector indicating a class to which the data belongs among a plurality of classes is set as an output sample, and to output a vector indicating a posterior probability of the class to which the data belongs on the basis of the input data.

(Supplementary Note 4)

The similarity degree calculator according to Supplementary Note 3, in which the model network is learned such that an inner product of calculation results of the N feature calculation models is reduced when the input sample is input.

(Supplementary Note 5)

The similarity degree calculator according to Supplementary Note 3 or Supplementary Note 4, in which the model network is learned such that a difference between the calculation results of the N feature calculation models when the input sample is input and the calculation results of the N feature calculation models when adversarial examples of the input sample are input is reduced.

(Supplementary Note 6)

The similarity degree calculator described in any one of Supplementary Note 1 to Supplementary Note 5, in which the data is data that represents biological information.

(Supplementary Note 7)

An authorization system includes the similarity degree calculator described in Supplementary Note 6, and an authorization device that performs biological authorization on the basis of a calculation result of the similarity degree calculator.

(Supplementary Note 8)

The authorization system according to Supplementary Note 7 in which the similarity degree calculator calculates a similarity degree between input biological data and biological data for a person to be authorized, and the authorization device determines that authorization has succeeded when the similarity degree exceeds a first threshold value.

(Supplementary Note 9)

The authorization system according to Supplementary Note 8, in which the similarity degree calculator further calculates the similarity degree between the input biological data and detection data, which is biological data for a person not to be authorized, and the authorization device determines that the authorization has failed regardless of the similarity degree with the biological data for a person to be authorized when the similarity degree for the detection data exceeds a second threshold value.

(Supplementary Note 10)

A similarity degree calculation method includes calculating, by a computer, N features for first data and N features for second data by using N feature functions for obtaining a feature for data on the basis of the data, and calculating, by the computer, a similarity degree between the first data and the second data on the basis of the N features for the first data and the N features for the second data, in which values of N features obtained when the same data is substituted into the N feature functions are different from each other.

(Supplementary Note 11)

A similarity degree calculation program that causes a computer to function as a feature calculation means that calculates N features for first data and N features for second data by using N feature functions for obtaining a feature for data on the basis of the data, and a similarity degree calculation means that calculates a similarity degree between the first data and the second data on the basis of the N features for the first data and the N features for the second data, in which values of N features obtained when the same data is substituted into the N feature functions are different from each other.

(Supplementary Note 12)

A method for generating a similarity degree calculation program includes causing, by a computer, a model network to be learned, which has a first calculation unit having N feature calculation models and a second calculation unit having a model with a calculation result of the first calculation unit as an input to use a learning data set where data is set as an input sample and a one-hot vector indicating a class to which the data belongs among a plurality of classes is set as an output sample, and to output a vector indicating a posterior probability of the class to which the data belongs on the basis of the input data, and generating, by the computer, a similarity degree calculation program by combining the N learned feature calculation model and similarity degree calculation functions for obtaining a similarity degree between the first data and the second data on the basis of calculation results of the N feature calculation models for the first data and calculation results of the N feature calculation models for second data.

INDUSTRIAL APPLICABILITY

According to at least one of the similarity degree calculator, the authorization system, the similarity degree calculation method, the similarity degree calculation program, and the method of generating the similarity degree calculation program, it is possible to suppress the occurrence of erroneous determination due to fluctuations derived from learning.

DESCRIPTION OF REFERENCE SYMBOLS

1 Authorization system
10 Learning device
11 Classification model storage unit
12 Data set acquisition unit
13 Learning unit
14 Model extraction unit
15 Output unit
20 Authorization device
21 User data storage unit
22 Model acquisition unit
23 Extraction model storage unit
24 Biological data acquisition unit
25 Feature extraction unit
26 Similarity degree calculation unit
27 Authorization unit

What is claimed is:

1. An authorization system comprising:
at least one memory storing instructions; and
at least one processor configured to execute the instructions to:
calculate N features for first data and N features for second data by using N feature functions for obtaining a feature for data, the first data representing a biological information of an authorization subject and the second data representing biological information of users;
calculate a similarity degree between the first data and the second data based on the N features for the first data and the N features for the second data; and
authorize the authorization subject to access a computing system or a location pursuant to permissions provided in an account of an identified user, wherein the calculated similarity degree between the first data of the authorization subject and the second data of the identified user is highest and more than a predetermined authorization threshold value,
wherein when data is input into the N feature functions, values of N features obtained from each feature function are different from each other,
wherein the N feature functions are constituted by N learned feature calculation models in a model network that has a first calculation unit having the N feature calculation models and a second calculation unit having a model with a calculation result of the first calculation unit as an input, and
wherein the model network is trained using a learning data set in which data is set as an input sample and a one-hot vector indicating a class, among a plurality of classes, to which the data belongs is set as an output sample, and the model network is trained to output a vector indicating a posterior probability of the class to which the data belongs based on the input sample.

2. The authorization system according to claim 1, wherein the at least one processor is configured to execute the instructions to:
calculate a shared feature for the first data and a shared feature for the second data by using a shared feature function for obtaining a shared feature shared as an input to the N feature functions; and
calculate the N features for the first data by inputting the shared feature for the first data to the N feature functions, and calculate the N features for the second data by inputting the shared feature for the second data to the N feature functions.

3. The authorization system according to claim 1, wherein the model network is trained such that an inner product of calculation results of the N feature calculation models is reduced when the input sample is input.

4. The authorization system according to claim 1, wherein the model network is train such that a difference between the calculation results of the N feature calculation models when the input sample is input and the calculation results of the N feature calculation models when adversarial examples of the input sample are input is reduced.

5. The authorization system according to claim 1, wherein the at least one processor is configured to execute the instructions to:
control a gate to permit or prohibit entry pursuant to the permissions provided in the account of the identified user.

6. An authorization method comprising:
calculating, by a computer, N features for first data and N features for second data by using N feature functions for obtaining a feature for data, the first data representing a biological information of an authorization subject and the second data representing biological information of users;
calculating, by the computer, a similarity degree between the first data and the second data based on the N features for the first data and the N features for the second data; and
authorize the authorization subject to access a computing system or a location pursuant to permissions provided in an account of an identified user, wherein the calculated similarity degree between the first data of the authorization subject and the second data of the identified user is highest and more than a predetermined authorization threshold value, wherein when data is input into the N feature functions, values of N features obtained from each feature function are different from each other, wherein the N feature functions are constituted by N learned feature calculation models in a model network that has a first calculation unit having the N feature calculation models and a second calculation unit having a model with a calculation result of the first calculation unit as an input, and wherein the model network is trained using a learning data set in which data is set as an input sample and a one-hot vector indicating a class, among a plurality of classes, to which the data belongs is set as an output sample, and the model network is trained to output a vector indicating a posterior probability of the class to which the data belongs based on the input sample.

7. A method for generating an authorization program comprising:

training, by a computer, a model network;

generating, by the computer, an authorization program to:

calculate N features for first data and N features for second data by using N feature functions for obtaining a feature for data, the first data representing a biological information of an authorization subject and the second data representing biological information of users;

calculate a similarity degree between the first data and the second data based on of the N features for the first data and the N features for the second data; and authorize the authorization subject to access a computing system or a location pursuant to permissions provided in an account of an identified user, wherein the calculated similarity degree between the first data of the authorization subject and the second data of the identified user is highest and more than a predetermined authorization threshold value, wherein when data is input into the N feature functions, values of N features obtained from each feature function are different from each other, wherein the N feature functions are constituted by N learned feature calculation models in the model network that has a first calculation unit having the N feature calculation models and a second calculation unit having a model with a calculation result of the first calculation unit as an input, and wherein the model network is trained using a learning data set in which data is set as an input sample and a one-hot vector indicating a class, among a plurality of classes, to which the data belongs is set as an output sample, and the model network is trained to output a vector indicating a posterior probability of the class to which the data belongs based on the input sample.

* * * * *